United States Patent
Henry et al.

(10) Patent No.: US 6,587,929 B2
(45) Date of Patent: Jul. 1, 2003

(54) APPARATUS AND METHOD FOR PERFORMING WRITE-COMBINING IN A PIPELINED MICROPROCESSOR USING TAGS

(75) Inventors: G. Glenn Henry, Austin, TX (US); Rodney E. Hooker, Austin, TX (US)

(73) Assignee: IP-First, L.L.C., Freemont, CA (US)

( * ) Notice: Subject to any disclaimer, the term of this patent is extended or adjusted under 35 U.S.C. 154(b) by 0 days.

(21) Appl. No.: 09/920,568

(22) Filed: Jul. 31, 2001

(65) Prior Publication Data

US 2003/0033491 A1 Feb. 13, 2003

(51) Int. Cl.$^7$ .............................................. G06F 12/00
(52) U.S. Cl. ...................... 711/141; 711/144; 711/145; 711/220; 710/52; 710/54; 710/57
(58) Field of Search ......................... 711/141–145, 220; 710/52, 54, 57

(56) References Cited

U.S. PATENT DOCUMENTS 5,526,510 A * 6/1996 Akkary et al. ............... 711/133
5,630,075 A * 5/1997 Joshi et al. .................. 711/100

* cited by examiner

Primary Examiner—Do Hyun Yoo
Assistant Examiner—Ngoc Dinh
(74) Attorney, Agent, or Firm—E. Alan Davis; James W. Huffman

(57) ABSTRACT

A tag-based write-combining apparatus in a microprocessor. The apparatus includes a register that stores the store address of the last write-combinable store passing through the store stage of the pipeline. Tag allocation logic compares the last store address with the store address of a new store and allocates the same tag as was previously allocated to the last store if the addresses are in the same cache line, and assigns the next incremental tag otherwise. Tag registers store write buffer tags associated with store data in write buffers waiting to be written to memory on the processor bus. When the new store reaches the write buffer stage, tag comparators compare the new store tag with the write buffer store tags. If the tags match, the write buffer control logic combines the new store data with the store data in the write buffer with the matching tag.

45 Claims, 5 Drawing Sheets

*Tag-Based Write-Combining Apparatus*

FIG. 1 Tag-Based Write-Combining Apparatus

Write-Combining Apparatus Operation

Example 1 Code Sequence:

| | | |
|---|---|---|
| Store A: | ST | 0x00001000 0xAA |
| Store B: | ST | 0x00002000 0xBB |
| Store C: | ST | 0x00003000 0xCC |
| Store D: | ST | 0x00004000 0xDD |
| Store E: | ST | 0x00005000 0xEE |

| | Event | Action | LWSA/LWST | WB1 val/tag/qwab/data | WB2 val/tag/qwab/data | WB3 val/tag/qwab/data | WB4 val/tag/qwab/data |
|---|---|---|---|---|---|---|---|
| 1 | Initial conditions | | 0x0000/0 | 0x00/0/00/0x00...00 | 0x00/0/00/0x00...00 | 0x00/0/00/0x00...00 | 0x00/0/00/0x00...00 |
| 2 | Store A address mismatches LSA | Allocate tag 1 and update LSA and LST | 0x1000/1 | 0x00/0/00/0x00...00 | 0x00/0/00/0x00...00 | 0x00/0/00/0x00...00 | 0x00/0/00/0x00...00 |
| 3 | Store A tag mismatches WB tags | Allocate WB1 and load data | 0x1000/1 | 0x01/1/00/0x00...AA | 0x00/0/00/0x00...00 | 0x00/0/00/0x00...00 | 0x00/0/00/0x00...00 |
| 4 | Store B address mismatches LSA | Allocate tag 2 and update LSA and LST | 0x2000/2 | 0x01/1/00/0x00...AA | 0x00/0/00/0x00...00 | 0x00/0/00/0x00...00 | 0x00/0/00/0x00...00 |
| 5 | Store B tag mismatches WB tags | Allocate WB2 and load data | 0x2000/2 | 0x01/1/00/0x00...AA | 0x01/2/00/0x00...BB | 0x00/0/00/0x00...00 | 0x00/0/00/0x00...00 |
| 6 | Store C address mismatches LSA | Allocate tag 3 and update LSA and LST | 0x3000/3 | 0x01/1/00/0x00...AA | 0x01/2/00/0x00...BB | 0x00/0/00/0x00...00 | 0x00/0/00/0x00...00 |
| 7 | Store C tag mismatches WB tags | Allocate WB3 and load data | 0x3000/3 | 0x01/1/00/0x00...AA | 0x01/2/00/0x00...BB | 0x01/3/00/0x00...CC | 0x00/0/00/0x00...00 |
| 8 | Store D address mismatches LSA | Allocate tag 4 and update LSA and LST | 0x4000/4 | 0x01/1/00/0x00...AA | 0x01/2/00/0x00...BB | 0x01/3/00/0x00...CC | 0x00/0/00/0x00...00 |
| 9 | Store D tag mismatches WB tags | Allocate WB4 and load data | 0x4000/4 | 0x01/1/00/0x00...AA | 0x01/2/00/0x00...BB | 0x01/3/00/0x00...CC | 0x01/4/00/0x00...DD |
| 10 | Store E address mismatches LSA | Allocate tag 5 and update LSA and LST | 0x5000/5 | 0x01/1/00/0x00...AA | 0x01/2/00/0x00...BB | 0x01/3/00/0x00...CC | 0x01/4/00/0x00...DD |
| 11 | Store E tag mismatches WB tags No WBs available | Perform four 1-byte write transactions | 0x5000/5 | 0x00/1/00/0x00...AA | 0x00/2/00/0x00...BB | 0x00/3/00/0x00...CC | 0x00/4/00/0x00...DD |
| 12 | Flush complete | Allocate WB1 and load data | 0x5000/5 | 0x01/5/00/0x00...EE | 0x00/2/00/0x00...BB | 0x00/3/00/0x00...CC | 0x00/4/00/0x00...DD |

*Figure 3*

Example 2 Code Sequence:

| | | |
|---|---|---|
| Store A: | ST | 0x00001000 0xAA |
| Store B: | ST | 0x00002000 0xBB |
| Store C: | ST | 0x00003000 0xCC |
| Store D: | ST | 0x00004000 0xDD |
| Store E: | ST | 0x00004001 0xEE |
| Store F: | ST | 0x00005000 0xFF |

| | Event | Action | LWSA/ LWST | WB1 val/tag/qwab/ data | WB2 val/tag/qwab/ data | WB3 val/tag/qwab/ data | WB4 val/tag/qwab/ data |
|---|---|---|---|---|---|---|---|
| 1 | Initial conditions | Initial condition after Store A, B, C, D load in WBs as in Example 1 row 9 | 0x4000/ 4 | 0x01/1/00/ 0x00...AA | 0x01/2/00/ 0x00...BB | 0x01/3/00/ 0x00...CC | 0x01/4/00/ 0x00...DD |
| 2 | Store E address matches LSA | Assign tag 4 | 0x4000/ 4 | 0x01/1/00/ 0x00...AA | 0x01/2/00/ 0x00...BB | 0x01/3/00/ 0x00...CC | 0x01/4/00/ 0x00...DD |
| 3 | Store E tag and qwab match WB4 | Merge Store E in WB4 | 0x4000/ 4 | 0x01/1/00/ 0x00...AA | 0x01/2/00/ 0x00...BB | 0x01/3/00/ 0x00...CC | 0x03/4/00/ 0x00...EEDD |
| 4 | Store F address mismatches LSA | Allocate tag 5 and update LSA and LST | 0x5000/ 5 | 0x01/1/00/ 0x00...AA | 0x01/2/00/ 0x00...BB | 0x01/3/00/ 0x00...CC | 0x03/4/00/ 0x00...EEDD |
| 5 | Store F tag mismatches WB tags No WBs available | Perform 3 1-byte write transactions and 1 2-byte write transaction | 0x5000/ 5 | 0x01/1/00/ 0x00...AA | 0x01/2/00/ 0x00...BB | 0x01/3/00/ 0x00...CC | 0x03/4/00/ 0x00...EEDD |
| 6 | Flush complete | Allocate WB1 and load data | 0x5000/ 5 | 0x01/5/00/ 0x00...FF | 0x00/2/00/ 0x00...BB | 0x00/3/00/ 0x00...CC | 0x00/4/00/ 0x00...EEDD |

*Figure 4*

Example 3 Code Sequence:

| | | |
|---|---|---|
| Store A: | ST | 0x00001000 | 0xAAAAAAAAAAAAAAAA |
| Store B: | ST | 0x00001008 | 0xBBBBBBBBBBBBBBBB |
| Store C: | ST | 0x00001010 | 0xCCCCCCCCCCCCCCCC |
| Store D: | ST | 0x00001018 | 0xDDDDDDDDDDDDDDDD |
| Store E: | ST | 0x00001020 | 0xEEEEEEEEEEEEEEEE |

| | Event | Action | LWSA/ LWST | WB1 val/tag/qwab /data | WB2 val/tag/qwab /data | WB3 val/tag/qwab /data | WB4 val/tag/qwab /data |
|---|---|---|---|---|---|---|---|
| 1 | Initial conditions | | 0x00000/ 0 | 0x00/0/00/ 0x00...00 | 0x00/0/00/ 0x00...00 | 0x00/0/00/ 0x00...00 | 0x00/0/00/ 0x00...00 |
| 2 | Store A address mismatches LSA | Allocate tag 1 and update LSA and LST | 0x1000/ 1 | 0x00/0/00/ 0x00...00 | 0x00/0/00/ 0x00...00 | 0x00/0/00/ 0x00...00 | 0x00/0/00/ 0x00...00 |
| 3 | Store A tag mismatches WB tags | Allocate WB1 and load data | 0x1000/ 1 | 0xFF/1/00/ 0xAA...AA | 0x00/0/00/ 0x00...00 | 0x00/0/00/ 0x00...00 | 0x00/0/00/ 0x00...00 |
| 4 | Store B address matches LSA | Assign tag 1 | 0x1000/ 1 | 0xFF/1/00/ 0xAA...AA | 0x00/0/00/ 0x00...00 | 0x00/0/00/ 0x00...00 | 0x00/0/00/ 0x00...00 |
| 5 | Store B qwab mismatches WB qwab | Allocate WB2 and load data | 0x1000/ 1 | 0xFF/1/00/ 0xAA...AA | 0xFF/1/01/ 0xBB...BB | 0x00/0/00/ 0x00...00 | 0x00/0/00/ 0x00...00 |
| 6 | Store C address matches LSA | Assign tag 1 | 0x1000/ 1 | 0xFF/1/00/ 0xAA...AA | 0xFF/1/01/ 0xBB...BB | 0x00/0/00/ 0x00...00 | 0x00/0/00/ 0x00...00 |
| 7 | Store C qwab mismatches WB qwab | Allocate WB3 and load data | 0x1000/ 1 | 0xFF/1/00/ 0xAA...AA | 0xFF/1/01/ 0xBB...BB | 0xFF/1/10/ 0xCC...CC | 0x00/0/00/ 0x00...00 |
| 8 | Store D address matches LSA | Assign tag 1 | 0x1000/ 1 | 0xFF/1/00/ 0xAA...AA | 0xFF/1/01/ 0xBB...BB | 0xFF/1/10/ 0xCC...CC | 0x00/0/00/ 0x00...00 |
| 9 | Store D qwab mismatches WB qwab | Allocate WB4 and load data | 0x1000/ 1 | 0xFF/1/00/ 0xAA...AA | 0xFF/1/01/ 0xBB...BB | 0xFF/1/10/ 0xCC...CC | 0xFF/1/11/ 0xDD...DD |
| 10 | Store E address mismatches LSA | Allocate tag 2 and update LSA and LST | 0x1020/ 2 | 0xFF/1/00/ 0xAA...AA | 0xFF/1/01/ 0xBB...BB | 0xFF/1/10/ 0xCC...CC | 0xFF/1/11/ 0xDD...DD |
| 11 | Store E tag mismatches WB tags No WBs available | Perform 1 32-byte write transaction | 0x1020/ 2 | 0x00/1/00/ 0xAA...AA | 0x00/1/01/ 0xBB...BB | 0x00/1/10/ 0xCC...CC | 0x00/0/11/ 0xDD...DD |
| 12 | Flush complete | Allocate WB1 and load data | 0x1020/ 2 | 0xFF/2/00/ 0xEE...EE | 0x00/1/01/ 0xBB...BB | 0x00/1/10/ 0xCC...CC | 0x00/0/11/ 0xDD...DD |

Figure 5

APPARATUS AND METHOD FOR PERFORMING WRITE-COMBINING IN A PIPELINED MICROPROCESSOR USING TAGS

FIELD OF THE INVENTION

This invention relates in general to the field of store data write-combining in a microprocessor, and more particularly to using tags on data to write-combine rather than memory addresses.

BACKGROUND OF THE INVENTION

A typical computer system includes a microprocessor that writes, or stores, data to memory devices in the system, such as system memory or video frame buffers. The microprocessor is connected to the memory devices by a processor bus. Store instructions of software programs executing on the processor generate write transactions on the processor bus to write data to memory. In some circumstances it is desirable to delay writing the data of a store instruction on the processor bus to memory, and instead to buffer the data and combine it with data from one or more subsequent adjacent store instructions into a single write operation on the processor bus to memory. This operation is commonly referred to as write-combining.

An example of a circumstance in which write-combining is desirable is a video game program that updates the screen based on user input. The screen update portion of the program generates a large number of stores of video data to sequential addresses of a frame buffer in a video controller of the system. Because the stores of the video data are sequential, they may be buffered and combined, resulting in a fewer number of write transactions on the processor bus. A major advantage of write-combining is that it enables more efficient use of the processor bus as follows.

A typical write transaction on a processor bus to memory comprises an arbitration phase, address phase, one or more data phases, error phase, and completion phase. Assume the microprocessor has two stores of data to be written to memory. If the microprocessor performs the two stores as two separate write transactions on the bus, then it must perform two sets of arbitration, address, error, and completion phases in addition to the data phases. In contrast, if the microprocessor buffers the data from the first store and combines the second store with the first into one write transaction on the processor bus, the microprocessor only performs one set of arbitration, address, error, and completion phases. Additionally, some of the data phases may also potentially be eliminated depending upon the relationship between the size of the data being written and the width of the processor data bus. The avoidance of the redundant phases by write-combining is a more efficient use of the processor bus and potentially improves the write-throughput to the memory.

A typical processor bus enables the microprocessor to perform bus transactions to write a block of data varying in size from a single byte to an entire cache line. A common cache line size is 32 bytes of data. However, a typical physical data bus width of the processor bus is eight bytes. Assume the microprocessor executes four adjacent eight-byte stores of data aligned on eight-byte address boundaries. If the microprocessor performs four separate write transactions on the bus, then four data phases will be performed on the bus—one for each of the transactions. However, if the microprocessor combines the stores into a single write transaction, then the four data phases will be performed within a single transaction, eliminating the redundant non-data phases, and thereby using the processor bus more efficiently.

Furthermore, in the case of a screen update to a video frame buffer, hundreds of write-combined cache line write transactions may potentially be performed on the processor bus to sequential addresses in the frame buffer. In this case, the microprocessor may pipeline many such cache line write transactions on the processor bus thereby effectively eliminating even the non-data phases from an efficiency perspective in order to achieve close to the maximum write throughput possible on the processor bus, thereby updating the frame buffer very quickly.

In order to determine whether it is possible to write-combine a new write with pending writes, the microprocessor must compare the address of the new write with the addresses of pending writes to determine whether the new data may be merged with, or overwrite, the pending data. It is typically advantageous to the performance of the microprocessor to perform the comparison of the addresses and the loading of the new write data into a write buffer holding the pending data in the same microprocessor clock cycle.

Typically, the number of address bits that must be compared is relatively large: on the order of 32 bits. Consequently, performing a comparison of the new write address with the pending write addresses, deciding whether it is possible to write-combine, and muxing the data into the write buffer to perform the write-combine may take a relatively long time and create processor cycle timing problems. That is, the logic to perform the write-combining may become the critical timing path of the microprocessor, thereby reducing the processor cycle time. This is an undesirable consequence.

In addition, commonly the sources of the addresses of the new write data and the pending write data are located spatially a relatively large distance from the write buffers where the data is to be combined. This fact may also contribute to the write-combine logic becoming the critical timing path.

Therefore, what is needed is a means of reducing the time required to determine whether a write-combine may be performed.

SUMMARY

The present invention provides an apparatus and method for reducing the time required to determine whether store data may be combined in a write buffer with existing store data by making the determination based on a tag comparison rather than an address comparison. Accordingly, in attainment of the aforementioned object, it is a feature of the present invention to provide a write-combining apparatus in a microprocessor coupled to a memory by a bus, the microprocessor having write buffers for buffering data to be written to the memory on the bus. The apparatus includes tag allocation logic that allocates tags to store data associated with store instructions executing in the microprocessor. The tag allocation logic allocates the tags based on a comparison of bus addresses of the store data. The apparatus also includes a plurality of tag comparators, coupled to the tag allocation logic, which compare the tags allocated by the tag allocation logic. The apparatus also includes write buffer control logic, coupled to the plurality of tag comparators, that determines which of the write buffers to load the store data into based on the comparing of the tags by the plurality of tag comparators.

In another aspect, it is a feature of the present invention to provide an apparatus in a processor for determining whether first data of a first store operation may be combined with second data of a second store operation into a single write operation on a bus coupled to the processor. The first and second data have first and second addresses, respectively. The apparatus includes tag allocation logic that allocates a first tag to the first data based on a comparison of the first address with the second address. The apparatus also includes a tag comparator, coupled to the tag allocation logic, which compares the first tag with a second tag previously allocated by the tag allocation logic to the second data. The apparatus also includes write-combine logic, coupled to the tag comparator, which determines whether the first and second data may be combined based on the tag comparator comparing the first and second tags.

In another aspect, it is a feature of the present invention to provide a write-combining processor. The processor includes a plurality of write buffers that buffer an associated plurality of data for writing to memory on a bus coupled to the processor. The processor also includes a plurality of tag registers, coupled to the plurality of write buffers, which store a plurality of tags associated with the plurality of data. The processor also includes a store buffer, coupled to the plurality of write buffers, which buffers store data waiting to be written to a cache of the processor. The processor also includes a tag register, coupled to the store buffer, which stores a tag associated with the store data. The processor also includes a plurality of tag comparators, coupled to the plurality of tag registers, which compare the tag with the plurality of tags. The processor selectively combines the store data with one of the plurality of data buffered in the plurality of write buffers prior to writing to memory on the bus based on the comparing by the plurality of tag comparators.

In another aspect, it is a feature of the present invention to provide a method for performing write-combining in a microprocessor having a pipeline of stages. The method includes generating a first tag for first store data, comparing a first bus address of the first store data with a second bus address of second store data after the generating the first tag, and generating a second tag for second store data in response to the comparing the first and second bus addresses. The method also includes comparing the first and second tags, and selectively combining the first and second data based on the comparing the first and second tags.

An advantage of the present invention is that it potentially reduces the processor cycle time in a write-combining microprocessor by reducing the likelihood that the write-combining logic is the critical path. The invention reduces the likelihood that the write-combining logic is the critical path by comparing substantially an order of magnitude fewer bits to perform the write-combine and by potentially reducing the propagation delay time of the comparison result signal. The propagation delay time reduction is accomplished by locating the tag comparison logic spatially closer to the write-combine logic, thereby reducing the comparison result signal lengths. Further, the advantage is achieved by adding a relatively small amount of additional logic.

Other features and advantages of the present invention will become apparent upon study of the remaining portions of the specification and drawings.

BRIEF DESCRIPTION OF THE DRAWINGS

FIGS. 3 through 5 are tables illustrating examples of operation of the write-combining apparatus of FIG. 1 according to the flowchart of FIG. 2.

DETAILED DESCRIPTION

Figure 1:
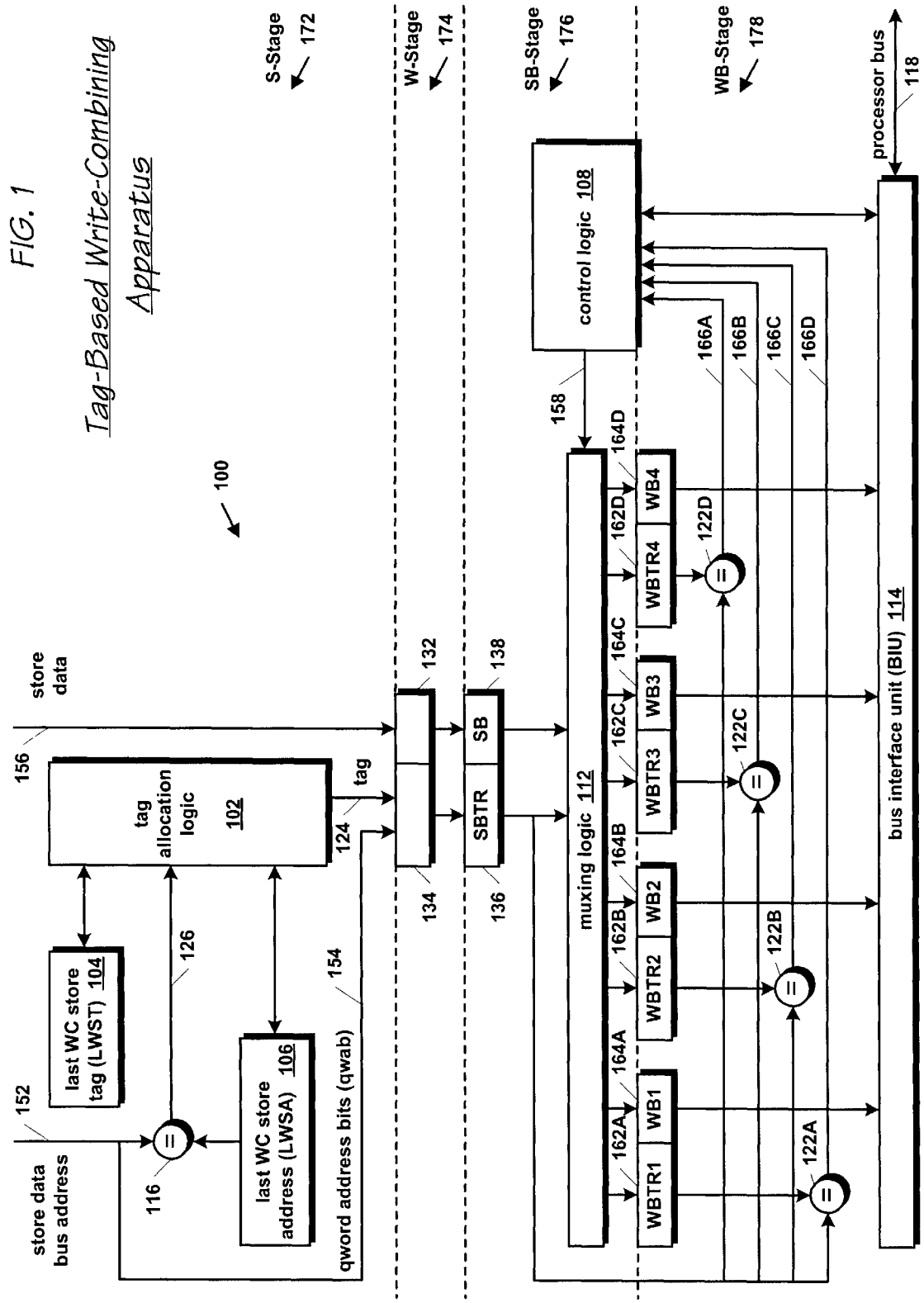
FIG. 1 is a block diagram of a write-combining apparatus in a pipelined microprocessor according to the present invention.

Referring now to FIG. 1, a block diagram of a write-combining apparatus 100 in a pipelined microprocessor according to the present invention is shown. The microprocessor is coupled to memory by a processor bus 118. The memory comprises one or more memory devices, such as system DRAM or video frame buffers. In one embodiment, the microprocessor includes programmable registers for specifying ranges of the processor bus 118 in which write-combining is permissible.

The microprocessor comprises a multiple stage pipeline. FIG. 1 shows the bottom four stages of the pipeline: a store stage 172 (S-stage), followed by a write back stage 174 (W-stage), followed by a store buffer stage 176 (SB-stage), followed by a write buffer stage 178 (WB-stage). The write-combining apparatus 100 is comprised in the four stages.

The S-stage 172 receives store data 156 and an associated store data bus address 152. The store data 156 comprises data associated with a store instruction executed by the microprocessor. In one embodiment, the store data 156 comprises between one and eight bytes.

The store data bus address 152 specifies an address on the processor bus 118 of a location in memory to which the store data 156 is to be written. In one embodiment, the address bus portion of the processor bus 118 and the store data bus address 152 comprise 32 bits. In one embodiment, the cache line size of the microprocessor is 32 bytes. Hence, the upper 27 bits of the store data bus address 152 specify a cache line in which the store data 156 lies. Bits 3 and 4 specify which 8-byte word within the cache line the store data 156 lies. An 8-byte word is referred to herein as a quad-word or qword. Hence, bits 3 and 4 of the store data bus address 152 are referred to as the qword address bits (qwab) 154.

The write-combining apparatus 100 comprises tag allocation logic 102 in the S-stage 172. The tag allocation logic 102 allocates a tag 124 for write-combinable store instructions. That is, the tag allocation logic 102 allocates a tag 124 for the store data 156 when the store data 156 arrives at the S-stage 172 if the store data bus address 152 is in a range in which write-combining is allowed. The tag allocation logic 102 allocates the tag 124 based on the relationship of the store data bus address 152 of the new write-combinable store instruction to the store address of the last write-combinable store instruction passing through the S-stage 172. In one embodiment, the tag 124 comprises 3 bits for specifying up to 8 unique tags. The allocation of the tags by the tag allocation logic 102 is described in detail below.

The write-combining apparatus 100 also comprises a last write-combinable store address register (LWSA) 106, coupled to the tag allocation logic 102. The LWSA register 106 stores the store address of the last write-combinable store instruction passing through the S-stage 172. In one embodiment, the LWSA register 106 stores only the upper 27 bits of the store data bus address 152 of the last write-combinable store instruction.

The write-combining apparatus 100 also comprises a last write-combinable store tag register (LWST) 104 in the S-stage 172 coupled to the tag allocation logic 102. The LWST register 104 stores the tag 124 of the last write-combinable store instruction that passed through the S-stage 172, whose processor bus 118 address is correspondingly stored in the LWSA register 106.

The write-combining apparatus 100 also comprises an address comparator 116 in the S-stage 172. The address comparator 116 receives the LWSA from the LWSA register 106 and the store data bus address 152 and compares the two addresses. In one embodiment, the address comparator 116 compares the upper 27 bits of the LWSA 106 and the store data bus address 152 to determine whether the two addresses specify store data that lies in the same cache line. The address comparator 116 provides the result 126 of the comparison to the tag allocation logic 102.

The write-combining apparatus 100 also comprises a register 132 in the W-stage 174 that receives the store data 156 from the S-stage 172. The write-combining apparatus 100 comprises a register 134 in the W-stage 174 that receives the tag 124 from the tag allocation logic 102 and the qwab 154 of the store data bus address 152. The W-stage 174 is used to write back instruction results to a register file for updating the state of the microprocessor.

The write-combining apparatus 100 also comprises a store buffer tag register (SBTR) 136 in the SB-stage 176. The store buffer tag register 136 receives the tag and qwab from register 134 in the W-stage 174.

The write-combining apparatus 100 also comprises a plurality of store buffers in the SB-stage 176. FIG. 1 illustrates a single store buffer 138, which is illustrative of the plurality of store buffers. The store buffer 138 receives the store data from register 132 in the W-stage 174. The store buffer 138 stores the store data while the store data is waiting to be written to a data cache in the microprocessor, or to one of a plurality of write buffers 164 comprised in the write-combining apparatus 100 for writing to memory, or to both. In one embodiment, the store buffer 138 is configured to store eight bytes of store data.

The write-combining apparatus 100 also comprises muxing logic 112 in the SB-stage 176. The muxing logic 112 receives the store data from the store buffer 138 in addition to the tag and qwab from the store buffer tag register 136.

The write-combining apparatus 100 also comprises the plurality of write buffers 164 in the WB-stage 178. The write buffers 164 receive store data from the muxing logic 112. The muxing logic 112 directs store data from the store buffer 138 to the write buffers 164 as controlled by control logic 108 via control signals 158 as will be described below.

The embodiment of FIG. 1 includes four write buffers 164 denoted individually as 164A, 164B, 164C, and 164D, and referred to as write buffer 1 (WB1), write buffer 2 (WB2), write buffer 3 (WB3), and write buffer 4 (WB4) respectively. In one embodiment, each of the write buffers 164 is configured to store a qword. Hence, the four write buffers 164 collectively are capable of storing a cache line of the microprocessor. Each of the bytes in the write buffers 164 is individually addressable. The control logic 108 maintains state information to determine the availability of the write buffers 164, i.e., whether or not the write buffers 164 contain valid store data, and if so, which bytes of the store data are valid. The control logic 108 also maintains state information about whether the store data in the write buffers 164 are contiguous for communicating to the BIU 114 whether the store data in the write buffers 164 may be written on the processor bus 118 in a single write transaction rather than separate write transactions.

The write-combining apparatus 100 also comprises a plurality of write buffer tag registers (WBTR) 162 in the WB-stage 178. The write buffer tag registers 162 receive tags and qwab from the muxing logic 112. The muxing logic 112 directs tags and qwab from the store buffer tag register 136 to the write buffer tag registers 162 as controlled by the control logic 108 in association with store data written to a corresponding one of the write buffers 164.

The embodiment of FIG. 1 includes four write buffer tag registers 162 denoted individually as WBTR1 162A, WBTR2 162B, WBTR3 162C, and WBTR4 162D. The write buffer tag registers 162 are associated with the write buffers 164. Each of the write buffer tag registers 162 stores a tag and qwab associated with the data stored in its associated write buffer 164.

The write-combining apparatus 100 also comprises a bus interface unit (BIU) 114. The BIU 114 interfaces the microprocessor with the processor bus 118. The BIU 114 receives store data from the write buffers 164 for writing to memory on the processor bus 118. The BIU 114 performs bus transactions on the processor bus 118 to transfer data between the microprocessor and memory according to the bus 118 protocol.

In particular, the BIU 114 performs write transactions on the bus 118 to transfer data from the microprocessor to memory. The write transactions performed by the BIU 114 may be the result of individual store instructions executed by the microprocessor, or they may be the result of multiple executed store instructions that have their store data combined into a fewer number of bus 118 write transactions than store instructions.

In one embodiment, the bus 118 comprises a bus compatible with the Pentium II® processor bus protocol. Other embodiments are contemplated in which the bus 118 is compatible with other x86 processor bus protocols. In particular, the bus 118 protocol supports write transactions of data larger than a single store instruction amount of data. However, the present invention is not limited to a particular processor bus protocol. Rather, the present invention is adaptable to various processor bus protocols that are amenable to write-combining. In one embodiment, the data bus portion of the processor bus 118 is eight bytes wide.

The write-combining apparatus 100 also comprises a plurality of tag comparators 122. The embodiment of FIG. 1 includes four tag comparators denoted individually as 122A, 122B, 122C, and 122D. Each of the tag comparators 122 receives the tag and qwab from the store buffer tag register 136 in the SB-stage 176. Each of the tag comparators 122 also receives the tag and qwab from a corresponding one of the write buffer tag registers 162 in the WB-stage 178. The tag comparators 122 generate results 166 of the comparisons between the tag/qwab associated with the store data in the store buffer 138 and the tag/qwab associated with the store data in the write buffers 164, denoted result signals 166A through 166D, respectively. The comparison results 166 are provided to the control logic 108. Advantageously, the control logic 108 uses the comparison results 166 to control the muxing logic 112 to selectively load the store data from the store buffer 138 to the write buffers 164 to aid in write-combining, as will be described below.

Figure 2:
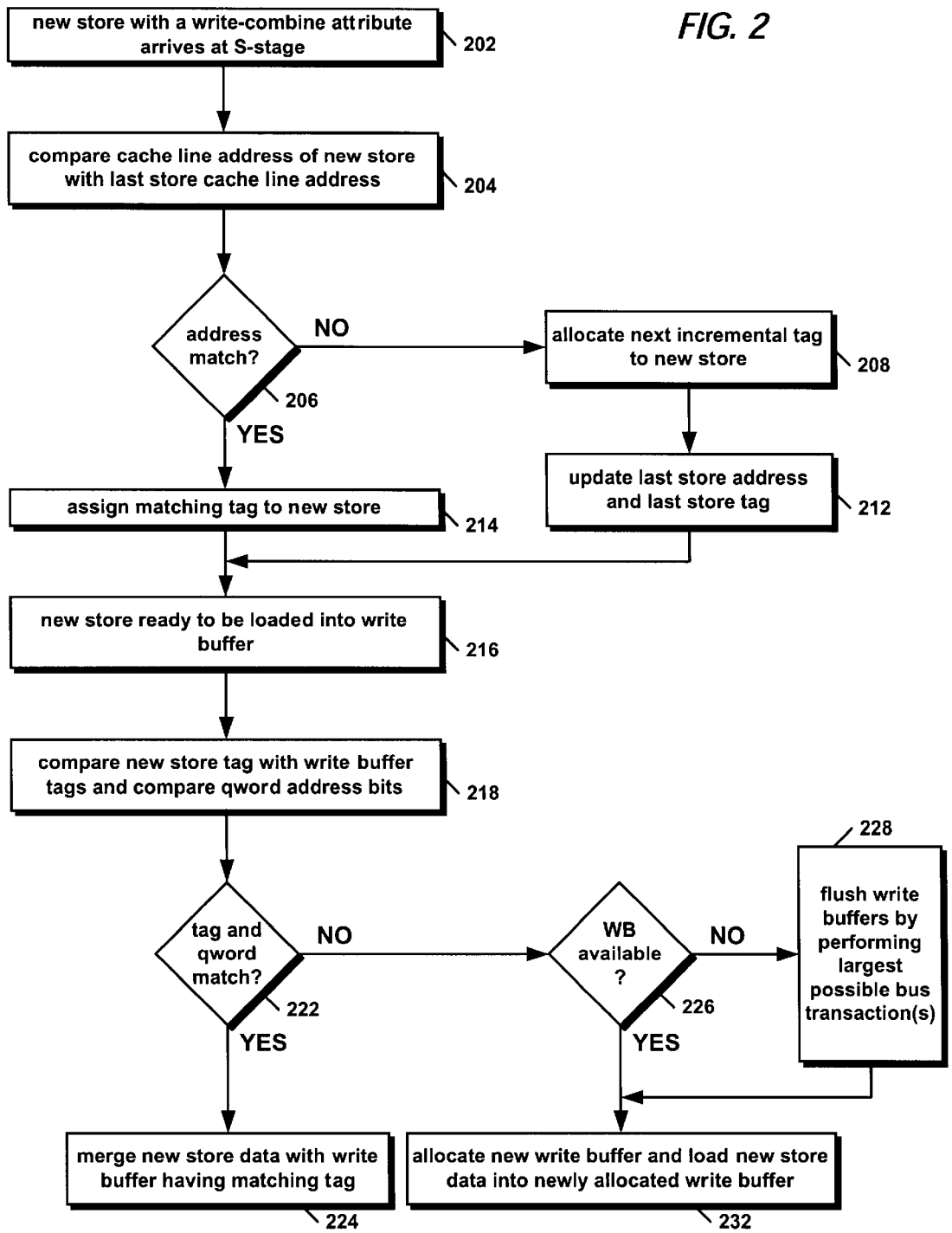
FIG. 2 is a flowchart illustrating operation of the write-combining apparatus of FIG. 1.

Referring now to FIG. 2, a flowchart illustrating operation of the write-combining apparatus 100 of FIG. 1 is shown. Flow begins at block 202.

At block 202, a new write-combinable store instruction arrives at the S-stage 172 of FIG. 1. That is, the new store data 156 and new store data bus address 152 of FIG. 1 arrive at the S-stage 172. The new store instruction has a memory caching attribute such that it is allowed to be write-combined with other stores. That is, the new store data bus address 152 is to a region of the processor bus 118 address space in which write-combining is allowable by the microprocessor. Flow proceeds from block 202 to block 204.

At block 204, the address comparator 116 of FIG. 1 compares the new store data bus address 152 with the LWSA 106 of FIG. 1. Flow proceeds from block 204 to decision block 206.

At decision block 206, the tag allocation logic 102 of FIG. 1 determines whether the new store data bus address 152 matches the LWSA 106 based on the comparison result 126 generated by the address comparator 116 generated during block 204. In particular, the tag allocation logic 102 determines whether the new store data 156 and the last store data specified by the LWSA 106 lie in the same 32-byte cache line. If not, flow proceeds to block 208. Otherwise, flow proceeds to block 214.

At block 208, the tag allocation logic 102 allocates the next incremental tag after the LWST 104 of FIG. 1 to the new store data 156, since the new store data bus address 152 and the LWSA 106 mismatch, as determined during block 206. That is, the tag allocation logic 102 provides a tag 124 of FIG. 1 to register 134 of FIG. 1 to associate with the new store data 156. The new tag 124 is a different tag from the LWST 104 to indicate that the new store data 156 does not lie in the same cache line as the last store data specified by the LWSA 106. In one embodiment, the tag allocation logic 102 allocates the next incremental tag by incrementing the LWST 104 and wrapping back to a tag value of zero once the tag value overflows the tag size, i.e., after the tag value reaches seven. Flow proceeds from block 208 to block 212.

At block 212, the tag allocation logic 102 updates the LWSA register 106 with the new store data bus address 152 and updates the LWST register 104 with the new tag 124 allocated during block 208. Flow proceeds from block 212 to block 216.

At block 214, the tag allocation logic 102 assigns the matching tag, i.e., the LWST 104, to the new store data 156 since the new store data bus address 152 and the LWSA 106 match, as determined during block 206. That is, the tag allocation logic 102 provides a tag 124 of FIG. 1 to register 134 of FIG. 1 to associate with the new store data 156. The new tag 124 is the same tag as the LWST 104 to indicate that the new store data 156 lies in the same cache line as the last store data specified by the LWSA 106. Flow proceeds from block 214 to block 216.

At block 216, the new store instruction proceeds into the store buffer 138 of FIG. 1 and is ready to be loaded into one of the write buffers 164 of FIG. 1. Flow proceeds from block 216 to block 218.

At block 218, the tag comparators 122 of FIG. 1 compare the new store tag and qwab from the store buffer tag register 136 with the write buffer tags and qwab from the write buffer tag registers 162. Flow proceeds from block 218 to decision block 222.

At decision block 222, the tag control logic 108 determines whether the new store tag and qwab matches any of the write buffer tags and qwab based on the comparison results 166 generated by the tag comparators 122 during block 218. If so, flow proceeds to block 224. Otherwise, flow proceeds to decision block 226.

At block 224, the control logic 108 merges the new store data with the store data in one of the write buffers 164 whose tag and qwab match the new store tag and qwab as determined during decision block 222. That is, the control logic 108 controls the muxing logic 112 to load the new store data from the store buffer 138 into the matching write buffer 164. Advantageously, this will result in a write-combine, since the store data merged from the two different store instructions may have the ability to be written to memory on the processor bus 118 with a single write transaction, rather than with two distinct write transactions. Depending upon the size and byte location of the store data in the matching write buffer 164 and the size and location of the new store data in the store buffer 138, the data will be merged with and/or overwrite the store data already in the write buffer 164. Flow ends at block 224.

At decision block 226, the control logic 108 determines whether one of the write buffers 164 is available for loading the new store data from the store buffer 138, since the new store tag and qwab did not match any of the write buffer tag and qwab. That is, the control logic 108 determines whether at least one of the write buffers 164 is empty of valid store data. If not, flow proceeds to block 228. Otherwise, flow proceeds to block 232.

At block 228, the control logic 108 and BIU 114 operate to flush the write buffers 164. The write buffers 164 are flushed by performing the largest possible write transaction on the processor bus 118 with the store data present in the write buffers 164. For example, if the write buffers 164 contain an entire cache line, the BIU 114 performs a single write transaction on the processor bus 118 to write the entire cache line. However, if a cache line write is not possible, i.e., if the write buffers 164 contain store data that lies in different cache lines, or is not contiguous, then the BIU 114 performs multiple write transactions that are as large as possible to use the processor bus 118 most efficiently. Flow proceeds from block 228 to block 232.

At block 232, control logic 108 allocates an available write buffer and loads the new store data from the store buffer 138 into the newly allocated write buffer 164. Flow ends at block 232.

Referring now to FIG. 3, a table illustrating an example of operation of the write-combining apparatus 100 of FIG. 1 according to the flowchart of FIG. 2 is shown. The table illustrates execution by the write-combining apparatus 100 of the following Example 1 code sequence:

| Store A: | ST | 0x00001000 | 0xAA |
| Store B: | ST | 0x00002000 | 0xBB |
| Store C: | ST | 0x00003000 | 0xCC |
| Store D: | ST | 0x00004000 | 0xDD |
| Store E: | ST | 0x00005000 | 0xEE |

The code sequence comprises five write-combinable single-byte store instructions, denoted Store A, B, C, D, and E. The value of the store data 156 of FIG. 1 and store data bus address 152 of FIG. 1 for each store instruction is shown. As will be seen from the description below, the Example 1 code sequence does not provide an opportunity for the write-combining apparatus 100 to perform write combining.

The table comprises eight columns. The first column indicates the row number. The second column describes an event. The third column describes an action taken by the write-combining apparatus 100 in response to the event. The fourth column specifies the contents of the LWSA register 106 and the LWST register 104 of FIG. 1 after the action described in the third column. The fifth through eighth columns specify the contents of the write buffer tag registers 162 and write buffers 164 of FIG. 1 after the action described in the third column.

In particular, the fifth through eighth columns specify which bytes of the corresponding write buffer 164 are valid, the value of the tag in the corresponding write buffer tag register 162, the value of the qwab in the write buffer tag register 162, and the store data in the write buffer 164.

Row 1 of the table specifies the initial conditions; hence, no action is specified. Initially, the LWSA 106 is 0x0000, the LWST 104 is 0, and the write buffers 164 are empty, i.e., all of the data bytes are invalid.

In row 2, the store data bus address 152 of Store A mismatches the LWSA 106, as determined during block 206 of FIG. 2. Consequently, the tag allocation logic 102 of FIG. 1 allocates the next incremental tag, tag 1, to Store A and updates the LWSA 106 and LWST 104 with the Store A store data bus address 152, 0x1000, and newly allocated tag value, tag 1, according to blocks 208 and 212, respectively, of FIG. 2.

In row 3, the control logic 108 determines that the tag of Store A mismatches all of the write buffer tags, i.e., all of the tags in the write buffer tag registers 162, according to block 222 of FIG. 2. Consequently, the control logic 108 allocates WB1 164A to Store A, and loads the Store A data, 0xAA, into WB1 164A, according to block 232 of FIG. 2.

In row 4, the store data bus address 152 of Store B mismatches the LWSA 106, as determined during block 206. Consequently, the tag allocation logic 102 allocates the next incremental tag, tag 2, to Store B and updates the LWSA 106 and LWST 104 with the Store B store data bus address 152, 0x2000, and newly allocated tag value, tag 2, according to blocks 208 and 212, respectively.

In row 5, the control logic 108 determines that the tag of Store B mismatches all of the write buffer tags, according to block 222. Consequently, the control logic 108 allocates WB2 164B to Store B and loads the Store B data, 0xBB, into WB2 164B, according to block 232.

In row 6, the store data bus address 152 of Store C mismatches the LWSA 106, as determined during block 206. Consequently, the tag allocation logic 102 allocates the next incremental tag, tag 3, to Store C and updates the LWSA 106 and LWST 104 with the Store C store data bus address 152, 0x3000, and newly allocated tag value, tag 3, according to blocks 208 and 212, respectively.

In row 7, the control logic 108 determines that the tag of Store C mismatches all of the write buffer tags, according to block 222. Consequently, the control logic 108 allocates WB3 164C to Store C and loads the Store C data, 0xCC, into WB3 164C, according to block 232.

In row 8, the store data bus address 152 of Store D mismatches the LWSA 106, as determined during block 206. Consequently, the tag allocation logic 102 allocates the next incremental tag, tag 4, to Store D and updates the LWSA 106 and LWST 104 with the Store D store data bus address 152, 0x4000, and newly allocated tag value, tag 4, according to blocks 208 and 212, respectively.

In row 9, the control logic 108 determines that the tag of Store D mismatches all of the write buffer tags, according to block 222. Consequently, the control logic 108 allocates WB4 164D to Store D and loads the Store D data, 0xDD, into WB4 164D, according to block 232.

In row 10, the store data bus address 152 of Store E mismatches the LWSA 106, as determined during block 206. Consequently, the tag allocation logic 102 allocates the next incremental tag, tag 5, to Store E and updates the LWSA 106 and LWST 104 with the Store E store data bus address 152, 0x5000, and newly allocated tag value, tag 5, according to blocks 208 and 212, respectively.

In row 11, the control logic 108 determines that the tag of Store E mismatches all of the write buffer tags, according to block 222. The control logic 108 also determines that no write buffers 164 are available according to block 226 of FIG. 2. Consequently, the control logic 108 and BIU 114 of FIG. 1 flush the write buffers 164 by performing four 1-byte write transactions on the processor bus 118, according to block 228 of FIG. 2.

In row 12, the flush of the write buffers 164 is complete, and the control logic 108 allocates WB1 164A to Store E and loads the Store E data, 0xEE, into WB1 164A, according to block 232.

As may be seen from the table description, the Example 1 code sequence does not provide an opportunity for the write-combining apparatus 100 to perform write combining. That is, the relationship of the store data bus addresses 152 of the four Store instructions, A through D, was such that they resulted in four write transactions being generated on the processor bus 118. In particular, the Store instruction data was in different cache lines. Now, an example will be described in which the relationship of the store data bus addresses 152 of the Store instructions is such that the write-combining apparatus 100 performs write-combining.

Referring now to FIG. 4, a table illustrating another example of operation of the write-combining apparatus 100 of FIG. 1 according to the flowchart of FIG. 2 is shown. The table is similar to the table of FIG. 3, and illustrates execution by the write-combining apparatus 100 of the following Example 2 code sequence:

| Store A: | ST | 0x00001000 | 0xAA |
| Store B: | ST | 0x00002000 | 0xBB |
| Store C: | ST | 0x00003000 | 0xCC |
| Store D: | ST | 0x00004000 | 0xDD |
| Store E: | ST | 0x00004001 | 0xEE |
| Store F: | ST | 0x00005000 | 0xFF |

The code sequence comprises six write-combinable single-byte store instructions, denoted Store A, B, C, D, E, and F. The first four store instructions are the same as those of Example 1 of FIG. 3. As will be seen from the description below, the Example 2 code sequence provides an opportunity for the write-combining apparatus 100 to perform write combining.

Row 1 of the table specifies the initial conditions. The initial conditions for the table are the state after the first four store instructions have been executed, i.e., after the store data for Stores A, B, C, and D have been loaded in the write buffers 164, as in row 9 of the table in Example 1 of FIG. 3. Initially, the LWSA 106 is 0x4000, the LWST 104 is 4, and the write buffers 164 each have their least significant byte having valid data.

In row 2, the store data bus address 152 of Store E matches the LWSA 106, as determined during block 206. That is, Store E specifies the same cache line as Store D, the last store instruction passing through the S-stage 172. Consequently, the tag allocation logic 102 assigns the matching tag, tag 4, to Store E, according to block 214.

In row 3, the control logic 108 determines that the tag and qwab of Store E matches the tag and qwab in WBTR4 162D, according to block 222. Consequently, the control logic 108 merges the Store E data, 0xEE, into WB4 164D, according to block 224 of FIG. 2.

In row 4, the store data bus address 152 of Store F mismatches the LWSA 106, as determined during block 206.

Consequently, the tag allocation logic 102 allocates the next incremental tag, tag 5, to Store F and updates the LWSA 106 and LWST 104 with the Store F store data bus address 152, 0x5000, and newly allocated tag value, tag 5, according to blocks 208 and 212, respectively.

In row 5, the control logic 108 determines that the tag of Store F mismatches all of the write buffer tags, according to block 222. The control logic 108 also determines that no write buffers 164 are available according to block 226. Consequently, the control logic 108 and BIU 114 flush the write buffers 164 by performing three 1-byte write transactions on the processor bus 118 to flush write buffers 164A, 164B, and 164C, and one 2-byte write transaction to flush write buffer 164D, according to block 228 of FIG. 2.

In row 6, the flush of the write buffers 164 is complete, and the control logic 108 allocates WB1 164A to Store F and loads the Store F data, 0xFF, into WB1 164A, according to block 232.

As may be seen from the table description, the Example 2 code sequence provides an opportunity for the write-combining apparatus 100 to perform write combining. That is, the relationship of the store data bus addresses 152 of the five Store instructions, A through E, was such that they resulted in only four write transactions being generated on the processor bus 118, rather than five. In particular, the data of Store instructions D and E was in the same qword of the same cache line. Now, an example will be described in which the relationship of the store data bus addresses 152 of the Store instructions is such that the write-combining apparatus 100 performs write-combining of an entire cache line.

Referring now to FIG. 5, a table illustrating another example of operation of the write-combining apparatus 100 of FIG. 1 according to the flowchart of FIG. 2 is shown. The table is similar to the tables of FIGS. 3 and 4, and illustrates execution by the write-combining apparatus 100 of the following Example 3 code sequence:

| Store A: | ST | 0x00001000 | 0xAAAAAAAAAAAAAAAA |
| Store B: | ST | 0x00001008 | 0xBBBBBBBBBBBBBBBB |
| Store C: | ST | 0x00001010 | 0xCCCCCCCCCCCCCCCC |
| Store D: | ST | 0x00001018 | 0xDDDDDDDDDDDDDDDD |
| Store E: | ST | 0x00001020 | 0xEEEEEEEEEEEEEEEE |

The code sequence comprises five write-combinable qword store instructions, denoted Store A, B, C, D, and E. The values of the store data 156 of FIG. 1 and store data bus address 152 of FIG. 1 for each store instruction is shown. As will be seen from the description below, the Example 3 code sequence provides an opportunity for the write-combining apparatus 100 to perform write combining of an entire cache line.

Row 1 of the table specifies the initial conditions; hence, no action is specified. Initially, the LWSA 106 is 0x0000, the LWST 104 is 0, and the write buffers 164 are empty, i.e., all of the data bytes are invalid.

In row 2, the store data bus address 152 of Store A mismatches the LWSA 106, as determined during block 206. Consequently, the tag allocation logic 102 allocates the next incremental tag, tag 1, to Store A and updates the LWSA 106 and LWST 104 with the Store A store data bus address 152, 0x1000, and newly allocated tag value, tag 1, according to blocks 208 and 212, respectively.

In row 3, the control logic 108 determines that the tag of Store A mismatches all of the write buffer tags, according to block 222. Consequently, the control logic 108 allocates WB1 164A to Store A, and loads the Store A data, 0xAAAAAAAAAAAAAAAA, into WB1 164A, according to block 232.

In row 4, the store data bus address 152 of Store B matches the LWSA 106, as determined during block 206. That is, the cache line address of Store B matches the LWSA 106. Consequently, the tag allocation logic 102 assigns the matching tag, tag 1, to Store B, according to block 214.

In row 5, the control logic 108 determines that the qwab of Store B mismatches all of the write buffer qwab, according to block 222. Consequently, the control logic 108 allocates WB2 164B to Store B and loads the Store B data, 0xBBBBBBBBBBBBBBBB, into WB2 164B, according to block 232.

In row 6, the store data bus address 152 of Store C matches the LWSA 106, as determined during block 206. Consequently, the tag allocation logic 102 assigns the matching tag, tag 1, to Store C, according to block 214.

In row 7, the control logic 108 determines that the qwab of Store C mismatches all of the write buffer qwab, according to block 222. Consequently, the control logic 108 allocates WB3 164C to Store C and loads the Store C data, 0xCCCCCCCCCCCCCCCC, into WB3 164C, according to block 232.

In row 8, the store data bus address 152 of Store D matches the LWSA 106, as determined during block 206. Consequently, the tag allocation logic 102 assigns the matching tag, tag 1, to Store D, according to block 214.

In row 9, the control logic 108 determines that the qwab of Store D mismatches all of the write buffer qwab, according to block 222. Consequently, the control logic 108 allocates WB4 164D to Store D and loads the Store D data, 0xDDDDDDDDDDDDDDDD, into WB4 164D, according to block 232.

In row 10, the store data bus address 152 of Store E mismatches the LWSA 106, as determined during block 206. Consequently, the tag allocation logic 102 allocates the next incremental tag, tag 2, to Store E and updates the LWSA 106 and LWST 104 with the Store E store data bus address 152, 0x1020, and newly allocated tag value, tag 2, according to blocks 208 and 212, respectively.

In row 11, the control logic 108 determines that the tag of Store E mismatches all of the write buffer tags, according to block 222. The control logic 108 also determines that no write buffers 164 are available according to block 226. Consequently, the control logic 108 and BIU 114 of FIG. 1 flush the write buffers 164 by performing one 32-byte write transaction on the processor bus 118, according to block 228 of FIG. 2.

In row 12, the flush of the write buffers 164 is complete, and the control logic 108 allocates WB1 164A to Store E and loads the Store E data, 0xEEEEEEEEEEEEEEEE, into WB1 164A, according to block 232.

As may be seen from the table description, the Example 3 code sequence provides an opportunity for the write-combining apparatus 100 to perform write combining of an entire cache line. That is, the relationship of the store data bus addresses 152 of the four Store instructions, A through D, was such that they resulted in a single 32-byte write transaction being generated on the processor bus 118. In particular, the data of the four Store instructions comprised the four qwords of an entire cache line.

Thus, it may be seen from the forgoing description that the present invention advantageously provides a means for performing write-combining by comparing small address tags rather than large addresses during the cycle in which the loading of the store data into the write buffers is performed. Advantageously, the logic in the associated write-combining circuitry is potentially avoided as being the critical path for cycle timing of the microprocessor since the tag compares are faster than the address compares, and the tag compares may be performed closer to the write-buffer control logic than the address compares.

Although the present invention and its objects, features, and advantages have been described in detail, other embodiments are encompassed by the invention. For example, the notion of comparing tags rather than addresses to determine which of the write buffers to place the store data into may be applied to write buffer widths, processor bus data bus widths, processor bus address bus widths, and cache line widths of various sizes. In addition, the number of tags allocable and manner in which a distinct tag is allocated may vary.

Those skilled in the art should appreciate that they can readily use the disclosed conception and specific embodiments as a basis for designing or modifying other structures for carrying out the same purposes of the present invention without departing from the spirit and scope of the invention as defined by the appended claims.

We claim:

1. A write-combining apparatus in a microprocessor coupled to a memory by a bus, the microprocessor having write buffers for buffering data to be written to the memory on the bus, the apparatus comprising:

tag allocation logic, for allocating tags to store data associated with store instructions executing in the microprocessor, wherein said tag allocation logic allocates said tags based on a comparison of bus addresses of said store data;

a plurality of tag comparators, coupled to said tag allocation logic, for comparing said tags allocated by said tag allocation logic; and write buffer control logic, coupled to said plurality of tag comparators, for determining which of the write buffers to load said store data into based on said comparing of said tags by said plurality of tag comparators.

2. The apparatus of claim 1, further comprising:

a plurality of tag registers, coupled to said plurality of tag comparators, for storing write buffer tags, said write buffer tags comprising ones of said tags allocated by said tag allocation logic that are associated with a portion of said store data stored in associated ones of the write buffers.

3. The apparatus of claim 2, wherein each of said plurality of tag comparators compares an associated one of said write buffer tags with a new tag.

4. The apparatus of claim 3, wherein said new tag comprises one of said tags allocated by said tag allocation logic associated with new store data.

5. The apparatus of claim 4, wherein said new store data comprises a portion of said store data that is not yet stored in one of the write buffers.

6. The apparatus of claim 5, wherein said tag allocation logic allocates said new tag based on a comparison of a new bus address associated with said new store data and a last bus address.

7. The apparatus of claim 6, wherein said last bus address comprises a bus address associated with a last of said store data for which said tag allocation logic previously allocated one of said tags.

8. The apparatus of claim 7, wherein if said new bus address and said last bus address are in a same cache line, said tag allocation logic allocates said new tag with a same value as a last tag.

9. The apparatus of claim 8, wherein said last tag comprises one of said tags allocated by said tag allocation logic for said last of said store data associated with said last bus address.

10. The apparatus of claim 9, wherein if said new bus address and said last bus address are not in a same cache line, said tag allocation logic allocates said new tag with a different value as said last tag.

11. The apparatus of claim 10, wherein said different value as said last tag comprises a next incremental value of said last tag.

12. The apparatus of claim 5, wherein if said new tag matches one of said write buffer tags, said write buffer control logic loads said new data into a one of the write buffers associated with said matching write buffer tag.

13. The apparatus of claim 12, wherein said write buffer control logic loads said new data into said one of the write buffers associated with said matching write buffer tag only if said new data resides in a same subset of a cache line as a portion of said store data in said one of the write buffers associated with said matching write buffer tag.

14. The apparatus of claim 13, wherein said subset of said cache line comprises a portion of said cache line equal to a width of one of the write buffers.

15. The apparatus of claim 13, wherein said subset of said cache line comprises a portion of said cache line equal to a width of a data bus portion of the bus.

16. The apparatus of claim 13, wherein said subset of said cache line comprises eight bytes.

17. The apparatus of claim 12, wherein if said new tag does not match any of said write buffer tags, said write buffer control logic loads said new data into an empty one of the write buffers.

18. The apparatus of claim 17, wherein if none of the write buffers are empty, said write buffer control logic writes to the memory on the bus said data in one or more of the write buffers to generate said empty one of the write buffers.

19. An apparatus in a processor for determining whether first data of a first store operation may be combined with second data of a second store operation into a single write operation on a bus coupled to the processor, the first and second data having first and second addresses, respectively, the apparatus comprising:

tag allocation logic, for allocating a first tag to the first data based on a comparison of the first address with the second address;

a tag comparator, coupled to said tag allocation logic for comparing said first tag with a second tag previously allocated by said tag allocation logic to the second data; and write-combine logic, coupled to said tag comparator, for determining whether the first and second data may be combined based on said tag comparator comparing said first and second tags.

20. The apparatus of claim 19, wherein said tag allocation logic allocates said first tag with a value equal to said second tag if the first and second addresses specify a same cache line.

21. The apparatus of claim 20, wherein said tag allocation logic allocates said first tag with a value distinct from said second tag if the first and second addresses do not specify said same cache line.

22. The apparatus of claim 19, wherein said tag comparator and said write-combine logic are configured to compare said first and second tags and to load the first data into a write buffer of the processor in a single clock cycle of the processor.

23. The apparatus of claim 22, wherein said tag allocation logic is configured to allocate said first tag to the first data based on said comparison of the first address with the second address at least one processor clock cycle prior to said single clock cycle in which the first data is written into said write buffer.

24. The apparatus of claim 19, wherein said first and second tags comprise substantially fewer bits than the first and second addresses.

25. The apparatus of claim 24, wherein said first and second tags comprise fewer than half as many bits as the first and second addresses.

26. The apparatus of claim 19, wherein the first and second addresses comprise at least 25 bits.

27. A write-combining processor, comprising:
    an address register, for storing a last write-combinable store address;
    a tag register, coupled to said address register, for storing a last write-combinable store tag; a comparator, coupled to said address register, for comparing said last write-combinable store address with a new store address of new store data;
    tag allocation logic, coupled to said comparator, for allocating a new tag to said new store data, wherein said tag allocation logic allocates said last write-combinable store tag to said new store data if said last write-combinable store address matches said new store address, and allocates a different tag than said last write-combinable store tag if said last write-combinable store address does not match said new store address;
    a plurality of write buffers, for buffering an associated plurality of data for writing to memory on a bus coupled to the processor;
    a plurality of tag registers, coupled to said plurality of write buffers, for storing a plurality of tags associated with said plurality of data; and
    a plurality of tag comparators, coupled to said plurality of tag registers, for comparing said new tag with said plurality of tags;
    wherein the processor selectively combines said new store data with one of said plurality of data buffered in said plurality of write buffers prior to writing to said memory on said bus based on said comparing by said plurality of tag comparators.

28. The microprocessor of claim 27, further comprising:
    a bus interface unit, coupled between said plurality of write buffers and said bus, for writing said associated plurality of data to said memory on said bus.

29. The microprocessor of claim 28, wherein said bus interface unit writes said associated plurality of data to said memory on said bus with fewer bus transactions on said bus than a number of store instructions executed by the microprocessor to generate said plurality of data stored in said plurality of write buffers.

30. The microprocessor of claim 27, wherein said tag allocation logic allocates said new tag from a predetermined set of tags.

31. The microprocessor of claim 30, further comprising:
    write buffer control logic, coupled to said plurality of write buffers, for selectively combining said new store data with said one of said plurality of data buffered in said plurality of write buffers prior to writing to said memory on said bus based on said comparing by said plurality of tag comparators.

32. The microprocessor of claim 31, wherein the microprocessor comprises a pipeline of stages, wherein said tag allocation logic is located in a stage of the pipeline prior to a stage in which said write buffer control logic is located.

33. The microprocessor of claim 31, wherein the microprocessor comprises a pipeline of stages, wherein said plurality of tag comparators is located in a same stage of the pipeline as said write buffer control logic.

34. The microprocessor of claim 27, wherein said plurality of tag comparators each compare less than six bits.

35. A method for performing write-combining in a microprocessor having a pipeline of stages, the method comprising:
    generating a first tag for first store data;
    comparing a first bus address of said first store data with a second bus address of second store data after said generating said first tag;
    generating a second tag for second store data in response to said comparing said first and second bus addresses;
    comparing said first and second tags; and
    selectively combining said first and second data based on said comparing said first and second tags.

36. The method of claim 35, wherein said comparing said first and second bus addresses comprises determining whether said first and second bus address specify a same cache line.

37. The method of claim 36, wherein said generating said second tag comprises generating said second tag with a same value as said first tag if said first and second bus addresses specify said same cache line.

38. The method of claim 37, wherein said generating said second tag comprises generating said second tag with a different value than said first tag if said first and second bus addresses do not specify said same cache line.

39. The method of claim 35, wherein said comparing said first and second tags comprises determining whether said first and second tags match.

40. The method of claim 39, wherein said selectively combining said first and second data comprises combining said first and second data if said first and second tags match.

41. The method of claim 40, wherein said selectively combining said first and second data comprises combining said first and second data if said first and second tags match and if said first and second data reside in a same word of an address space of a processor bus coupled to the microprocessor.

42. The method of claim 41, wherein said word comprises a width of a data bus portion of said processor bus.

43. The method of claim 41, wherein said word comprises a width of eight bytes.

44. The method of claim 40, wherein said combining comprises merging said second store data into a write buffer in which said first data has already been loaded.

45. The method of claim 39, wherein said selectively combining said first and second data comprises:
    loading said first and second data into disparate write buffers if said first and second tags do not match; and
    writing said first and second data from said disparate write buffers to a memory on a bus coupled to the processor in a single transaction on said bus.

* * * * *